(12) United States Patent
Weisberg et al.

(10) Patent No.: US 7,998,515 B2
(45) Date of Patent: Aug. 16, 2011

(54) METHOD AND APPARATUS FOR PREVENTING THE DISCHARGE OF POWDERY CAFFEINE DURING COFFEE ROASTING

(75) Inventors: Matthew P. Weisberg, Key Biscayne, FL (US); John R. Perkins, Mesa, AZ (US); Kevin Allen, Covington, GA (US)

(73) Assignee: Group 32 Development and Engineering, Inc., Key Biscayne, FL (US)

( * ) Notice: Subject to any disclaimer, the term of this patent is extended or adjusted under 35 U.S.C. 154(b) by 1021 days.

(21) Appl. No.: 11/810,869

(22) Filed: Jun. 6, 2007

(65) Prior Publication Data

US 2008/0305229 A1 Dec. 11, 2008

(51) Int. Cl.
*A23F 5/04* (2006.01)
(52) U.S. Cl. .......... 426/469; 426/427; 426/523; 34/468; 34/479; 34/480
(58) Field of Classification Search .................. 426/629, 426/640, 466, 467, 469, 523, 427; 34/72–74, 34/76–79, 82, 85, 467, 468, 478, 479, 480
See application file for complete search history.

(56) References Cited

U.S. PATENT DOCUMENTS

| | | | | |
|---|---|---|---|---|
| 1,640,648 A | * | 8/1927 | Cross | 426/596 |
| 3,522,692 A | * | 8/1970 | Brookman | 55/233 |
| 4,284,609 A | * | 8/1981 | deVries | 423/243.08 |
| 4,322,445 A | * | 3/1982 | Peter et al. | 426/312 |
| 4,548,827 A | * | 10/1985 | Katz et al. | 426/427 |
| 4,818,552 A | * | 4/1989 | Kaper | 426/422 |
| 5,690,018 A | * | 11/1997 | Hansen | 99/330 |
| 5,928,697 A | * | 7/1999 | Argiles Felip | 426/466 |
| 7,285,300 B1 | * | 10/2007 | Allington et al. | 426/233 |
| 2009/0068338 A1 | * | 3/2009 | Lange et al. | 426/629 |
| 2009/0130277 A1 | * | 5/2009 | Bressner et al. | 426/466 |

FOREIGN PATENT DOCUMENTS

WO   WO 99/23888   *  5/1999

* cited by examiner

*Primary Examiner* — Drew E Becker
(74) *Attorney, Agent, or Firm* — Kilpatrick Townsend & Stockton LLP

(57) ABSTRACT

Coffee beans are roasted with heated air in a roasting chamber, and contaminant-laden exhaust air including caffeine entrained therein is discharged from the chamber. While roasting is in progress, the exhaust air from the chamber is heated, directed through a catalytic converter and cooled to a temperature between about 250° F. to 325° F. Thereafter the cooled exhaust air flows through a cooler or condenser where the temperature of the cooled exhaust air is further lowered to between about 100° F. and 155° F., and it is then directed through a HEPA filter to remove caffeine particles that are present in the cooled air. Substantially caffeine-free clean exhaust air can then be discharged from the HEPA filter directly to the surroundings of the roasting machine such as a closed room, e.g. a retail establishment, frequented by persons.

10 Claims, 3 Drawing Sheets

METHOD AND APPARATUS FOR PREVENTING THE DISCHARGE OF POWDERY CAFFEINE DURING COFFEE ROASTING

BACKGROUND OF THE INVENTION

Roasting apparatus for roasting fresh or green coffee beans is well-known and in wide use. The taste and fragrance of coffee depend largely on how and the degree to which the coffee beans have been roasted and how quickly, following roasting, the beans are consumed by brewing coffee with them. It is desirable to produce roasted coffee beans that are consistent in taste and fragrance and in a manner that minimizes storage times to optimize the taste of fresh coffee.

In the past, coffee beans were usually roasted at a central plant for sale at multiple retail locations, such as supermarkets, stores and specialty shops, as well as coffee and espresso bars. The roasted beans must be stored and shipped before they reach the consumer. This is in and of itself time-consuming and costly. In addition, for cost and transportation reasons it is not feasible to effectively distribute coffee that is roasted on a given day for sale at the various retail establishments on the same day. Thus, coffee beans presently for sale at retail establishments are seldom fresh and, typically, they are several days to several weeks old before they reach the consumer. This compromises the quality, and especially the aroma, of the coffee and, additionally, increases its cost because of the need to make relatively many deliveries from the roasting plant to the retail locations.

Such roasting techniques had additional problems. At typical roasting temperatures of about 500° F. (about 260° C.), large amounts of smoke and other byproducts are generated, such as carbon monoxide, white plume smoke, hydrocarbons, and volatile organic compounds ("VOCs"), that pollute the atmosphere unless the exhaust from the roaster is first cleaned. This typically required an expensive and energy-consuming afterburner that is normally built into the exhaust gas stack for the roasting machine extending through the surrounding wall or ceiling so that the vented exhaust is reasonably clean and non-polluting although it still contains air contaminants.

More recently, a roasting method and apparatus were developed that could be used at individual roasted coffee bean retail locations such as supermarkets, coffee shops and the like. Such roasters are described in International Application WO 99/23888. They cleaned the hot air used for roasting and cooled it to about room temperature so that the air could be discharged into interior locations, e.g. the interior of a store, without causing indoor pollution or undue heating. They required no exhaust to be discharged to the outside of the building, required no afterburners to eliminate pollutants, and roasted the coffee beans automatically without requiring the supervision of an experienced roastmaster. These roasters could economically roast relatively small batches of green coffee beans, for example the anticipated daily requirement so that truly fresh, daily roasted coffee could be sold.

In accordance with WO 99/23888, the roasting of beans for consumption (e.g. retail sale in stores or the brewing of coffee in espresso shops and the like) was conducted on site, for example in a store or an espresso shop, with individual, self-contained coffee roasting machines. Each such roasting machine was networked with a computer at a central control station that had the necessary processors and memory to record and store the roasting profiles/recipes and parameters needed for controlling and terminating the bean roasting.

For roasting coffee beans in the manner described in the preceding paragraphs, self-contained roasting machines were installed, for example, inside a retail establishment without a vent or exhaust to the exterior of the room. An air circulation system of such machines flowed heated intake air over the beans in the roasting chamber which exited the machine as used, contaminated exhaust air that included particulates, smoke and other pollutants. An air cleaning arrangement located downstream of the container effectively removed all contaminants entrained in the exhaust air to render it substantially pollutant-free used air. An air cooling arrangement was further operatively coupled with the air circulation system for cooling the used air so that it could be released into a surrounding room, e.g. a supermarket.

Thus, the exhaust air from the roaster was filtered to remove therefrom substantially all particulate matter down to sub-micron range, e.g. down to a size as small as about 0.03 micron, with a high up to 99.97% removed efficiency, and before the used air was discharged into the surrounding store it was cooled—according to WO 99/23888—to a temperature of no more than about 115° F. (about 46° C.) and preferably no more than about 100° F. (about 38° C.). In practice, the used air released by roasting machines constructed in accordance with WO 99/23888 had a temperature of no less than about 175° F. to 190° F. When the filtered and cooled air was discharged, there was no detectable pollution and at most only a negligible heating of air inside the store.

SUMMARY OF THE INVENTION

The assignee of the present invention continued to improve and refine the above referred to roasters to enhance their efficiencies, operation and reliability, and in this context intermittently operated such a roaster in a test facility over extended periods of time. During testing, it was observed and at least one report was received that a talc-like, powdery substance accumulated in the vicinity of the roaster which had a tendency to make persons exposed to it feel slightly ill and/or uncomfortable, although at the time it was not known whether the powdery substance or something else was the cause for this.

An accumulation of the powdery substance on the inside of conduits of the roaster was also observed. The fact that the powdery substance could make persons feel not well became a major concern.

In view thereof, an independent testing laboratory was commissioned to investigate the contents of the powdery substance that accumulated inside and outside the machine. Quite unexpectedly, the tests determined that the powdery substance constituted pure caffeine; that is, Fourier-Transform Infrared spectroscopy (FTIR) could detect no chemicals other than caffeine in the powdery substance.

Caffeine per se is a potentially harmful substance, which makes it mandatory that it not be released in an uncontrolled manner and, in particular, that any discharge of such powdery caffeine inside closed rooms and environments be prevented or minimized. It appears that caffeine is present in most or all exhaust from coffee roasters. Even now, almost all coffee is roasted in large establishments that vent the exhaust into the atmosphere to the exterior of buildings. Under such conditions, the accumulation of caffeine, in powdery form or otherwise, could not be detected and, since it was discharged to the outside, it also posed no health problems.

Having discovered that one of the byproducts of coffee roasting is the release of pure caffeine into the exhaust from the roasting chamber, the inventors attempted to determine how the caffeine could be removed from the exhaust prior to its discharge to the atmosphere by experimenting with a roaster that was generally constructed as described in WO 99/23888. The roaster was modified by directing the exhaust from the roasting chamber through a catalytic converter and, following appropriate cooling, the exhaust was released into the atmosphere. After the temperature of the exhaust discharged by the catalytic converter was lowered to about 300° F.-350° F. in an intervening heat exchanger, a condenser placed downstream of the catalytic converter further lowered the temperature of the discharge from the catalytic converter prior to its release into the surrounding atmosphere. The inventors discovered that by cooling the discharge from the catalytic converter to at least about 140° F., and preferably lower than that to a range between 100° F. to 125° F., before its release from the roaster, substantially no caffeine powder accumulated on the exterior of the roaster.

The inventors believe that this elimination of caffeine discharge into the surroundings is the result of cooling the caffeine sufficiently so that it changes its state by sublimation, deposition and/or condensation and forms particulate matter of a size greater or equal to 0.03 micron that can be trapped and removed from the discharge in fine filters such as a HEPA filter.

The inventors understand that some caffeine molecules also tend to adhere to the surface of water droplets or molecules. Although HEPA filters are incapable of filtering out water, and therefore water droplets with or without caffeine molecules adhering to their surfaces will pass through HEPA filters, a substantial proportion of such water droplets evaporate on their way to the discharge opening of the roaster. Once condensed, the caffeine molecules adhered to the condensed water become caked onto interior conduit surfaces of the roaster, where they subsequently dry. The adhering cake can be periodically released, for example by cleaning the conduits or subjecting them to vibration or shock, and/or by just flowing the exhaust air through the conduits while the caked-on caffeine is dry and brittle, to loosen the caked-on caffeine which is carried into the HEPA filter, where the caffeine particles are filtered out before the exhaust is released to the atmosphere to further reduce or substantially entirely eliminate the amount of caffeine powder that is released from the coffee roaster.

DETAILED DESCRIPTION OF THE INVENTION

The present invention is directed to a coffee bean roasting method and apparatus having an internal air cleaning system that eliminates the need for exhausting roasting air to the exterior of buildings. Instead, clean, cooled air, typically at or near room temperature, can be released into closed rooms, and the discharge and accumulation of caffeine, particularly fine caffeine powder, in the vicinity of the roasting machine is substantially eliminated. As a result, roasting machines made in accordance with this invention can be placed inside stores and can be operated to provide daily roasted coffee beans that have consistent and uniform flavor without exposing persons to unhealthy and potentially harmful caffeine residues, powder and the like, and the side effects this can cause.

Figure 1:
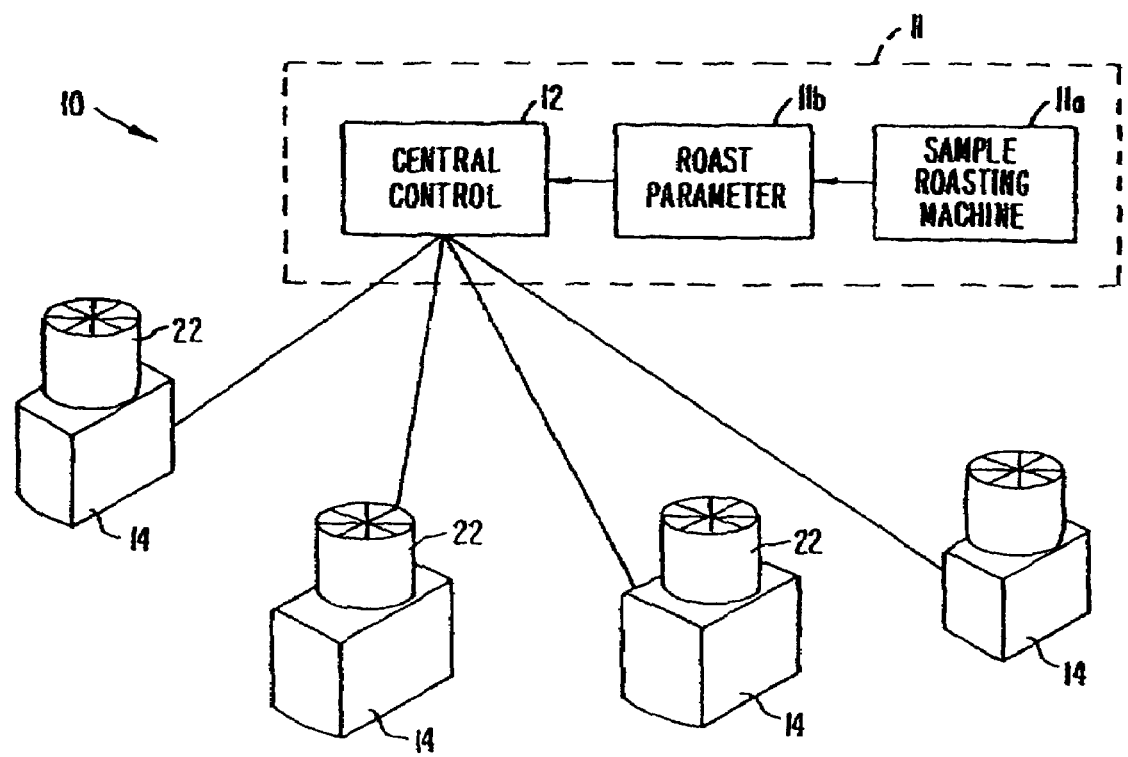
FIG. 1 is a perspective view schematically illustrating a centrally controlled roasting system with multiple, geographically dispersed roasting machines in which the present invention can be used.

FIG. 1 schematically illustrates a centrally controlled multi-station coffee roasting system 10 which can employ the present invention. The system has a central control station 11 that includes a computer or master control server 12 associated with a centrally located sample roasting machine 11a which supplies roasting parameters 11b to the master control server, as is described in WO 99/23888. A plurality of, typically many, geographically dispersed individual roasting machines 14 are networked with computer 12. Each of the individual roasting machines 14 includes an on-board computer with programmable logic controllers (PLCs) and/or a central processing unit (CPU) with on-board memory that is networked (telephonically or by wireless techniques, for example) with the control server.

A major advantage of the centralized system 10 is that consistent, uniform, high-quality bean roasts are assured. Further, since each roasting machine is on-site and can be activated whenever needed, the retailer can limit each roast so that no more than one-day's requirement for the beans is roasted, thereby assuring freshness and the best possible product for the consumer.

Figure 2:
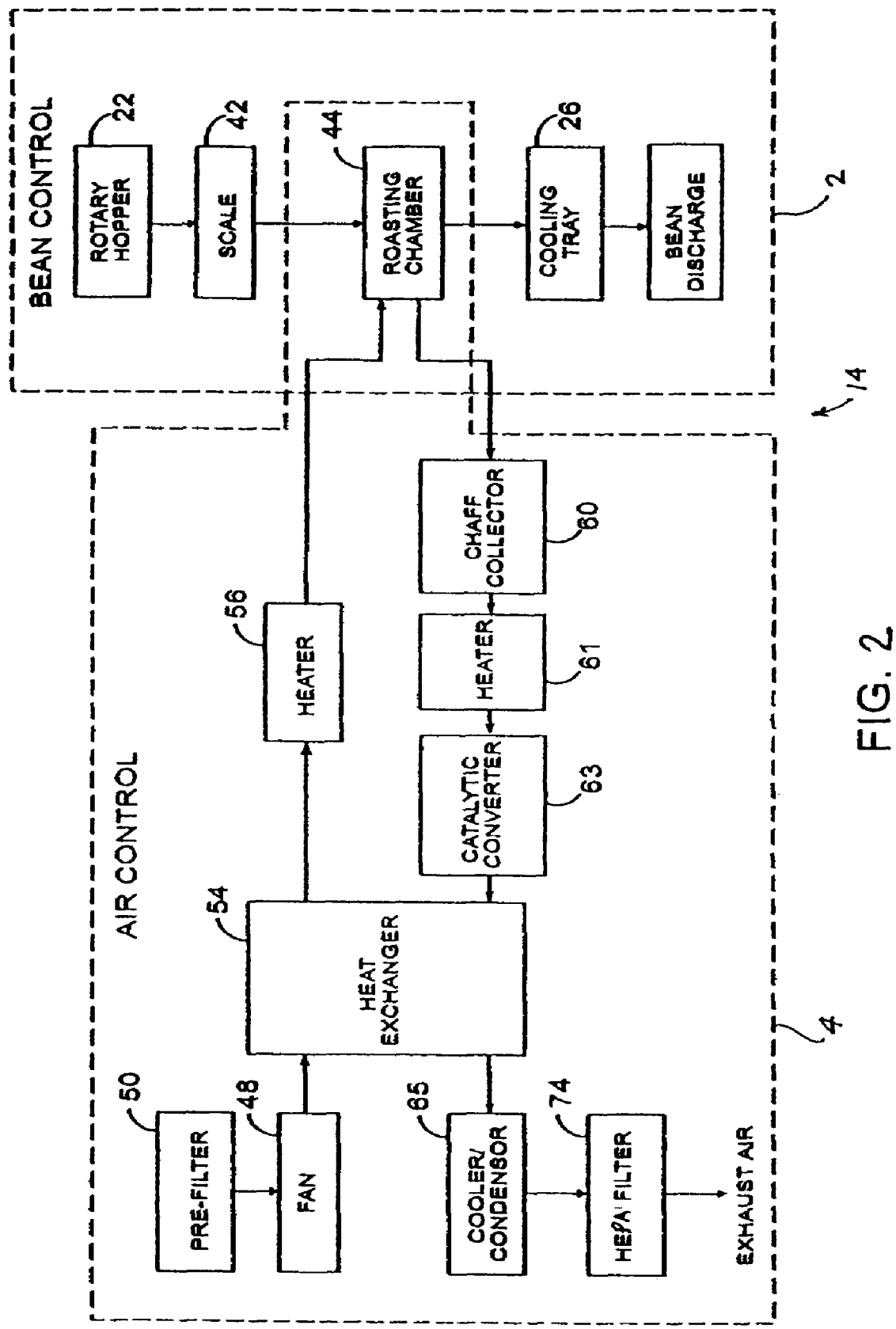
FIG. 2 is a block diagram illustrating the air control and handling system of an individual roasting machine of the system of FIG. 1.

Referring to FIG. 2, a roasting machine 14 constructed in accordance with the present invention has a bean control 2 and an air control 4.

Bean control 2 has a rotary hopper 22 from which fresh or green coffee beans are supplied to a roasting chamber 44, where the beans are subjected to hot air and the roasting surface of the drum and roasted to the desired degree, e.g. the desired color. A scale 42 may be interposed between the hopper and the roasting chamber for weighing batches of beans being loaded into the roasting chamber.

After the beans have been fully roasted, they are discharged from the roasting chamber onto a cooling tray 26, where they are permitted to cool, while they continue to release some smoke as they cool and await discharge into a suitable container, such as a bag, a hopper, or the like.

Air control 4 of the roaster furnishes hot air to roasting chamber 44 and treats the contaminant- and smoke-laden exhaust air from the chamber so that it can be released into the surroundings of the roasting machine. In particular, the exhaust air is sufficiently cleaned and cooled to a temperature that permits it to be discharged into a closed room without overheating the room, contaminating it, or otherwise adversely affecting the surrounding indoor environment.

A fan 48 of the air control draws fresh air from a prefilter 50. The air supplied to the prefilter may first be flowed over and past cooling tray 26 to preheat it, and any contaminants, particularly chaff, picked up by the air are removed by prefilter 50.

A heat exchanger 54 preheats the air it receives from fan 48. The preheated air flows from the heat exchanger 54 to a heater 56 for heating the air to the desired roasting temperature. The heater 56 can be a flow-through electric duct (tubular) heater capable, for example, of heating the incoming air from about 120° F. (about 49° C.) to the roasting temperature, e.g. about 500° F. (about 260° C.). From the heater the hot roasting air flows into and through a roasting chamber 44.

In the chamber, the green beans give off particulates, including chaff, as well as white plume smoke, oily smoke, volatiles, hydrocarbons, and, as the inventors have discovered, caffeine.

Chaff, an onionskin-like husk byproduct that is flaked off the beans in the roasting drum, is removed in a chaff collector 60 located downstream of and coupled to roasting chamber

44. The chaff collector 60 can be a vortex particulate separator (not shown) that captures the chaff and lets the air through. A chaff collecting tray is typically provided and periodically cleaned as needed. From the chaff collector, the exhaust can be flowed through a prefilter (not shown) and white plume smoke filter (not shown) for the removal of tars and chaff fines.

Still referring to FIG. 2, downstream of roasting chamber 44 the air control system 4 includes a heater 61 placed downstream of a chaff collector 60 to heat the air to about 600° F. to 650° F. before it is flowed through a catalytic converter 63 where most contaminants in the exhaust, but not caffeine, are combusted, or are converted into harmless substances, as is well known in the art. The discharge temperature from the catalytic converter can be as high as 1100° F. or more, and the exhaust air is first directed through heat exchanger 54 where heat is extracted from it and transferred to the incoming fresh roasting air from fan 48.

Exhaust air discharged by heat exchanger 54 typically has a temperature in the range between about 250° F. to 320° F. It is directed to a cooler/condenser 65 where it is cooled. Exhaust air leaving the condenser has a temperature in the range between about 100° F. to 155° F., preferably no more than about 140° F., and most preferably the exhaust air temperature is in the range between about 110° F. to 125° F. The cooled exhaust is then flowed through a HEPA filter 74 from which it is released into the surrounding atmosphere.

To remove the caffeine from the exhaust before it is discharged, it has to be in non-gaseous form so that it can be filtered out by HEPA filter 74. This not only requires that the exhaust temperature be less than the temperature at which caffeine sublimates or condenses (approximately 175° F. or 79° C.), there must also be sufficient time to effect such sublimation or condensation of the caffeine before it reaches the HEPA filter. Condenser 65 is therefore constructed so that it provides sufficient stay time for the exhaust discharged by heat exchanger 54 to effect sublimation and/or condensation of the caffeine in the condenser and downstream thereof but upstream of the HEPA filter.

Figure 3:
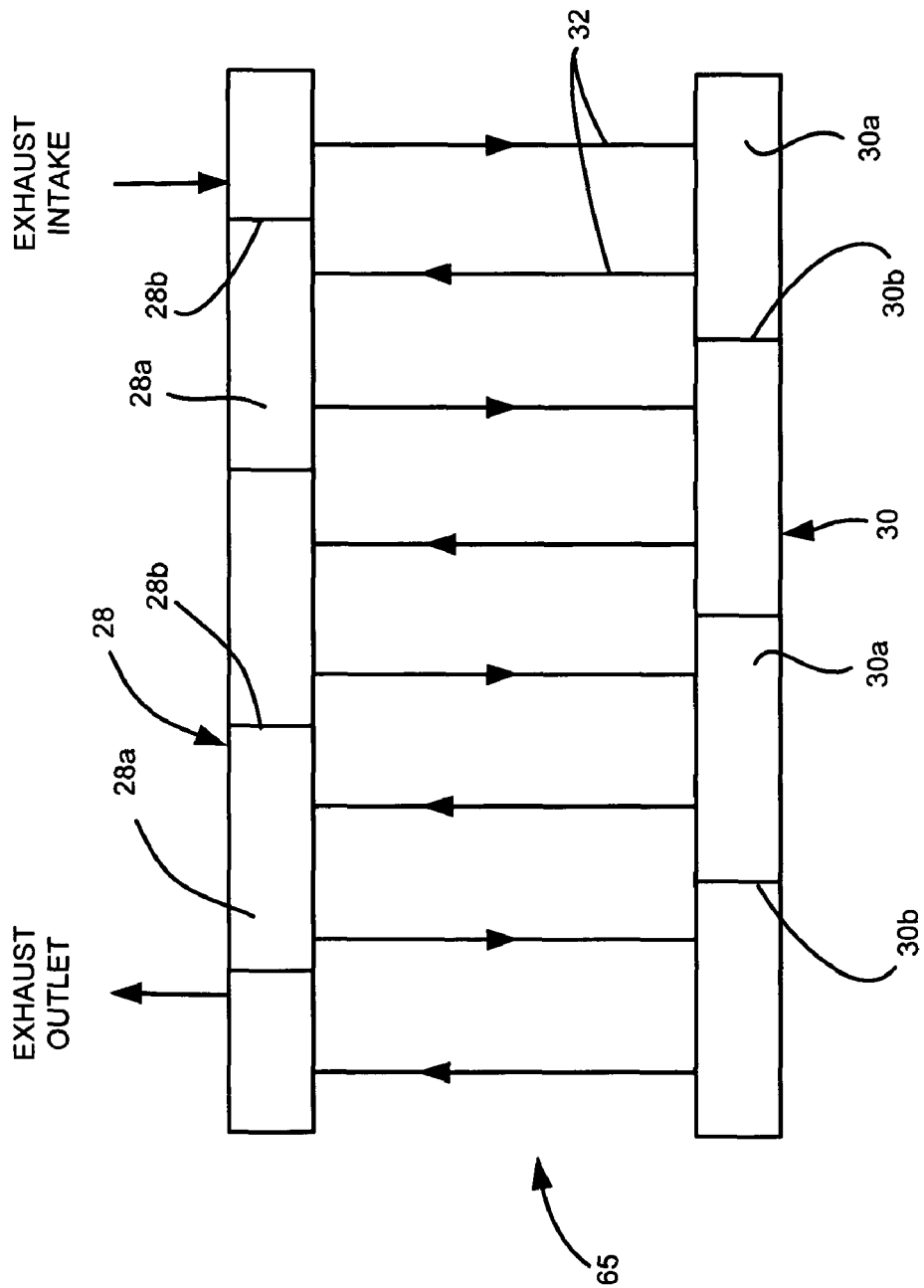
FIG. 3 is a schematic diagram of an exhaust air condenser made in accordance with the present invention.

Referring to FIG. 3, in a presently preferred embodiment of the invention, convection cooler/condenser 65 has an intake manifold 28 which receives exhaust air discharged by catalytic converter 63, typically at a temperature between about 250° F. to 320° F. An outlet manifold 30 is spaced apart from the intake manifold. Both manifolds are divided into manifold compartments 28a, 30b which are separated from each other by baffles 28b, 30b. A plurality of connector pipes 32 extend between the two manifolds, and they are arranged so that the exhaust gas flows alternatingly up and down (as seen in FIG. 3) between manifold compartments 28a and 30a as is illustrated in FIG. 3. The manifolds and connector pipes are made of a good heat conducting material, such as, for example, aluminum or copper pipes. In a presently preferred embodiment of the invention, condenser 65 is arranged on the exterior of the roasting machine, for example on top thereof, and the relatively hot exhaust from heat exchanger 54 is convection cooled and flows through the intake manifold, the transverse connecting pipes, and the outlet manifold towards HEPA filter 74.

To enhance the heat transfer from the hot exhaust air on the interior of condenser 65 to the atmospheric air in contact with the exterior of the condenser, it is advantageous to arrange the connector pipes transversely to the respective manifolds to form flow diverters where the connector pipes merge with the manifolds. This induces turbulence to the exhaust air as it propagates through the condenser and rapidly changes its flow direction and facilitates the heat exchange from the exhaust air via the condenser pipes to the surrounding atmosphere to cool the exhaust air before it enters HEPA filter 74.

The dimensioning of the condenser 65 is a function of the temperature differential between the exhaust is discharged by heat exchanger 54 and the desired temperature at which the exhaust is discharged by the condenser, the speed of the exhaust air through the roaster and, in particular, through the condenser, as well as the constituents of the encountered exhaust air. These and other factors relevant to the required stay time in the condenser for an exhaust air composition are readily determined, and those of ordinary skill in the art then dimension the condenser 65 so that it provides the needed stay time for the exhaust air to provide the desired temperature reduction for effecting the sublimation and/or condensation of caffeine before it reaches the HEPA filter.

During operation, the temperature of the exhaust air leaving the condenser will fluctuate with atmospheric temperature changes as well as with exhaust air temperature changes as the roasting machine heats up until it reaches a temperature equilibrium following the start-up of the machine. Thus, when dimensioning the condenser, those of ordinary skill in the art will take into consideration the anticipated temperature variations both on the interior and the exterior of the condenser with the objective that at all times the temperature leaving the condenser is sufficiently low so that entrained caffeine gas sublimates or condenses before it reaches the HEPA filter to make sure that the now-particulate caffeine is removed before the exhaust air is released to the exterior of the roaster.

When so constructed and operated, the HEPA filter removes substantially all caffeine entrained in the discharge from the catalytic converter and before its release from the coffee roaster.

As a result, no appreciable amount of caffeine powder was observed in the exhaust air leaving the HEPA filter for release into the atmosphere. Even after prolonged periods of operation and roasting of several thousand pounds of coffee, no powdery substance accumulated in or on the machine or its surroundings.

What is claimed is:

1. A method of limiting the discharge and a resulting accumulation of caffeine when roasting coffee beans inside a room of a building comprising roasting fresh coffee beans at a roasting temperature by flowing heated air over the fresh coffee beans in a roasting chamber and thereby releasing gaseous caffeine; withdrawing exhaust air including the gaseous caffeine therein from the chamber; flowing the exhaust air with gaseous caffeine therein through a catalytic converter; heating the exhaust air sufficiently to combust combustible materials in the exhaust air and generate a hot exhaust air with the gaseous caffeine remaining in the hot exhaust air; thereafter cooling the hot exhaust air and the gaseous caffeine therein to a temperature of between about 100° F. and 155° F. to provide cool exhaust air; maintaining the gaseous caffeine in the cool exhaust air for a sufficient time to sublimate or condense the gaseous caffeine into caffeine particles entrained in the cool exhaust air; thereafter flowing the cool exhaust air through a filter capable of removing the caffeine particles from the cool exhaust air; and thereafter releasing substantially caffeine-free, clean and cool exhaust air into the room.

2. A method according to claim 1 wherein cooling includes passing the hot exhaust air through a heat exchanger which lowers the temperature of the hot exhaust air in a first step to between about 250° F. and 325° F. and thereafter further cooling the exhaust air to between about 100° F. and 155° F.

3. A method according to claim 2 wherein further cooling comprises further cooling the exhaust air to a temperature of no more than about 140° F.

4. A method according to claim 2 wherein further cooling comprises further cooling the exhaust air to a temperature in the range between 110° F. and 125° F.

5. A method according to claim 1 wherein all steps following the discharge of the exhaust air from the chamber are simultaneously and continuously performed while roasting in the chamber is in progress.

6. A method according to claim 5 including placing the chamber inside an enclosed room frequented by persons, and wherein the substantially caffeine-free exhaust air is discharged into the room.

7. A method according to claim 1 wherein cooling the exhaust air discharged by the catalytic converter takes place in a heat exchanger and includes transferring heat from the exhaust air discharged from the catalytic converter to the heated air flowing into the chamber.

8. A method according to claim 1 including lowering the temperature of the cooled exhaust air to no more than about 100° F.

9. A method according to claim 1 wherein the step of cooling includes subjecting the hot exhaust air to turbulence by flowing the exhaust air through flow diverters.

10. A method of using a coffee roasting machine which roasts fresh coffee with hot air in a roasting chamber and discharges exhaust air into an indoor room, the method comprising roasting the fresh coffee beans at a roasting temperature by flowing hot air over the fresh coffee beans in the roasting chamber and thereby releasing gaseous caffeine into the exhaust air; withdrawing the exhaust air including the gaseous caffeine therein from the chamber; heating the exhaust air from the chamber sufficiently to combust combustible materials in the exhaust air and generate a hot exhaust air with the gaseous caffeine remaining in the hot exhaust air; flowing the hot exhaust air to a gas cooler mounted at a location exterior of the roasting machine; thereafter cooling the hot exhaust air and the gaseous caffeine in the gas cooler for a sufficient time to sublimate or condense the gaseous caffeine into caffeine particles entrained in the cooled exhaust air; thereafter flowing the cooled exhaust air and the caffeine particles through a filter capable of removing the caffeine particles from the cooled exhaust air; and thereafter releasing substantially caffeine-free, clean and cooled exhaust air into the indoor room.

* * * * *